US012608866B2

(12) United States Patent
Brady

(10) Patent No.: US 12,608,866 B2
(45) Date of Patent: *Apr. 21, 2026

(54) SYSTEM TO CONVERT EXPRESSION INPUT INTO A COMPLEX FULL BODY ANIMATION, IN REAL TIME OR FROM RECORDINGS, ANALYZED OVER TIME

(71) Applicant: AMGI ANIMATION STUDIOS, Burbank, CA (US)

(72) Inventor: Colin Brady, La Cresenta, CA (US)

(73) Assignee: AMGI Animation LLC, Burbank, CA (US)

( * ) Notice: Subject to any disclaimer, the term of this patent is extended or adjusted under 35 U.S.C. 154(b) by 204 days.

This patent is subject to a terminal disclaimer.

(21) Appl. No.: 18/117,844

(22) Filed: Mar. 6, 2023

(65) Prior Publication Data

US 2023/0206535 A1 Jun. 29, 2023

Related U.S. Application Data

(63) Continuation-in-part of application No. PCT/US2021/049699, filed on Sep. 9, 2021.

(60) Provisional application No. 63/076,262, filed on Sep. 9, 2020.

(51) Int. Cl.
| | |
|---|---|
| *G06T 13/40* | (2011.01) |
| *G06T 7/70* | (2017.01) |
| *G06T 13/20* | (2011.01) |
| *G06V 40/16* | (2022.01) |
| *G06V 40/20* | (2022.01) |
| *G10L 25/63* | (2013.01) |

(52) U.S. Cl.
CPC ............... *G06T 13/40* (2013.01); *G06T 7/70* (2017.01); *G06T 13/205* (2013.01); *G06V 40/171* (2022.01); *G06V 40/174* (2022.01); *G06V 40/23* (2022.01); *G06V 40/25* (2022.01); *G10L 25/63* (2013.01); *G06T 2207/30201* (2013.01)

(58) Field of Classification Search
CPC ......... G06T 13/40; G06T 7/70; G06T 13/205; G06T 2207/30201; G06V 40/171; G06V 40/174; G06V 40/23; G06V 40/25; G10L 25/63; G06Q 50/01
See application file for complete search history.

(56) References Cited

U.S. PATENT DOCUMENTS

| | | | |
|---|---|---|---|
| 6,535,215 B1 | 3/2003 | DeWitt | |
| 2003/0179204 A1 | 9/2003 | Mochizuki | |
| 2009/0153554 A1 | 6/2009 | Lim | |
| 2011/0007142 A1* | 1/2011 | Perez | A63F 13/213 348/E7.085 |
| 2011/0009241 A1 | 1/2011 | Lane | |
| 2011/0296324 A1* | 12/2011 | Goossens | G06Q 50/01 715/763 |
| 2012/0130717 A1* | 5/2012 | Xu | G06F 3/167 345/473 |

(Continued)

FOREIGN PATENT DOCUMENTS

| | | | | |
|---|---|---|---|---|
| KR | 102400398 | 5/2022 | | |
| WO | WO-2010057897 A1 * | 5/2010 | ............. | G06T 13/40 |

(Continued)

*Primary Examiner* — Maurice L. Mcdowell, Jr.
(74) *Attorney, Agent, or Firm* — LOEB & LOEB LLP

(57) ABSTRACT
A system is described to turn ordinary expression input into a complex full body animation in real time or from recordings analyzed over time.

14 Claims, 3 Drawing Sheets

(56)                    References Cited

U.S. PATENT DOCUMENTS

| | | | |
|---|---|---|---|
| 2013/0094722 A1 | 4/2013 | Hill | |
| 2014/0323817 A1 | 10/2014 | El Kaliouby | |
| 2016/0163084 A1* | 6/2016 | Corazza | G06V 40/172 |
| | | | 345/419 |
| 2017/0069125 A1 | 3/2017 | Geisner | |
| 2017/0287213 A1* | 10/2017 | Loper | G06T 13/40 |
| 2018/0025506 A1 | 1/2018 | Li | |
| 2020/0312003 A1* | 10/2020 | Borovikov | A63F 13/213 |
| 2020/0342648 A1* | 10/2020 | Shimizu | A61B 5/16 |
| 2021/0103340 A1 | 4/2021 | Bradski | |
| 2021/0158590 A1* | 5/2021 | Bradley | G06T 17/20 |
| 2021/0166459 A1* | 6/2021 | Miller, IV | G06F 1/1637 |
| 2021/0405739 A1* | 12/2021 | Bashkirov | G06F 3/0346 |

FOREIGN PATENT DOCUMENTS

| | | | | |
|---|---|---|---|---|
| WO | WO-2018128996 A1 * | 7/2018 | | G06T 13/20 |
| WO | 2022056151 | 3/2022 | | |

* cited by examiner

SYSTEM TO CONVERT EXPRESSION INPUT INTO A COMPLEX FULL BODY ANIMATION, IN REAL TIME OR FROM RECORDINGS, ANALYZED OVER TIME

CROSS-REFERENCE TO RELATED APPLICATIONS

This application is a continuation in part of PCT/US2021/049699 filed Sep. 9, 2021, which claims priority to U.S. Provisional Patent Application Ser. No. 63/076,262, filed on Sep. 9, 2020, the contents of each application are incorporated herein by reference in their entirety.

FIELD OF THE INVENTION

The present invention is in the technical field of animation systems and more particularly to a real time system to turn ordinary expression input into a complex full body animation.

BACKGROUND

Currently, there are a variety of animation rendering systems. The state of the art of user generated animation is very limited. For example, Apple's iPhone Animojis capture the user's face but only produces simple rotating heads and a sluggish more lethargic reproduction of the recording.

Other, more complex methods for rendering full body animation generally rely on green screen techniques with actors in special dot suits and multiple cameras in special studios. Even then, the cost of post production to make the captured dot images into an animated character and then super impose that character onto the scene is both time consuming and costly. Therefore, there is a need for a system to turn ordinary expression input into a complex full body animation in real time or from recordings analyzed over time, overcoming the limitations of the prior art.

BRIEF DESCRIPTION OF THE DRAWINGS

These and other features, aspects and advantages of the present invention will become better understood with regard to the following description, appended claims, and accompanying figures where:

SUMMARY

Figure 1:
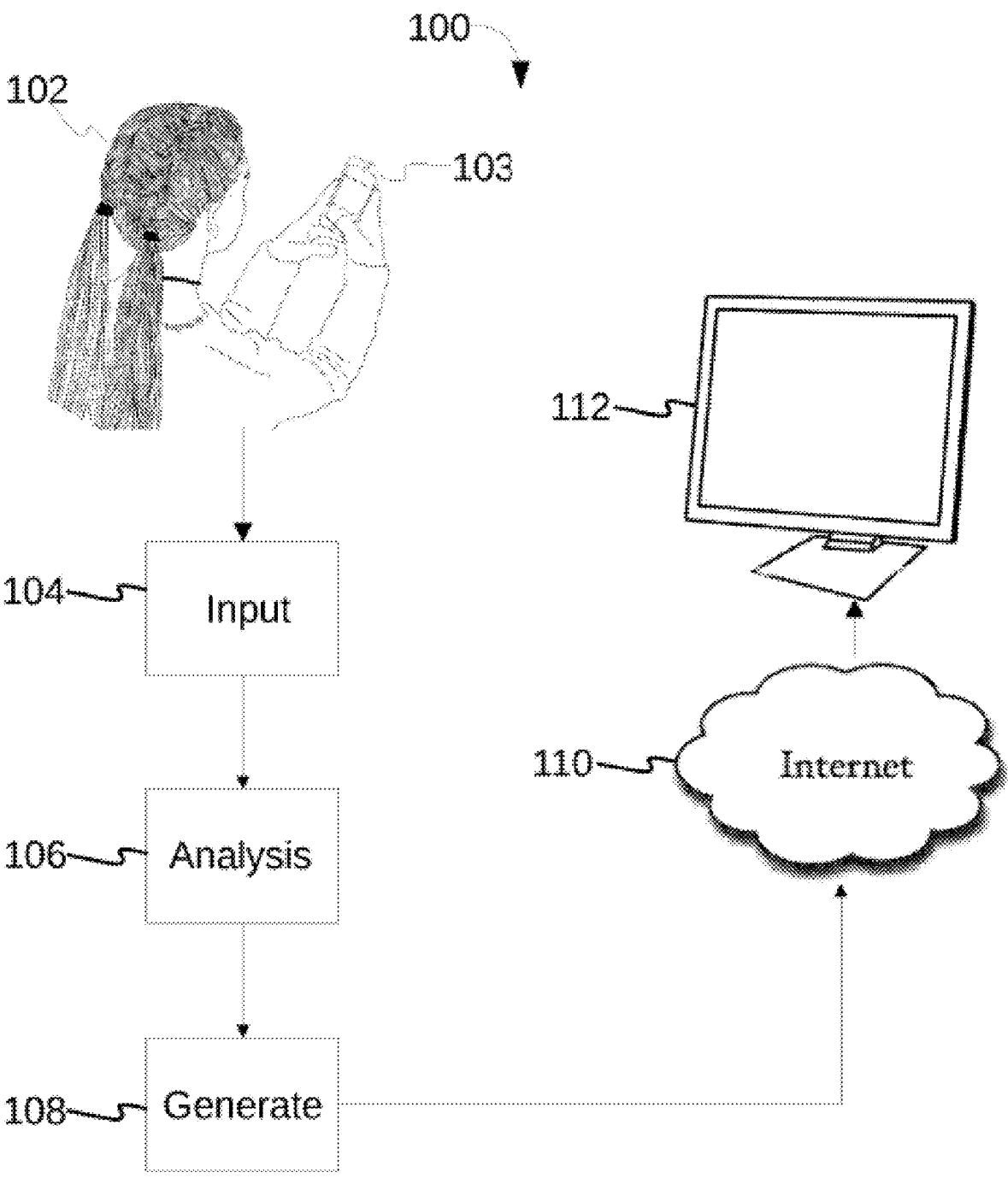
FIG. 1 is a workflow diagram of a system to turn ordinary expression input into a complex full body animation in real time or from recordings analyzed over time, according to one embodiment of the present invention.

What is provided is a system that may turn ordinary expression input into a complex full body animation in real time or from recordings analyzed over time. The system may includes one or more than one recording device, one or more than one processor capable of executing instructions for: selecting an animated character for a user to use in the animation; recording one or more than one facial movements, body movements, or both facial and body movements from the user on the recording device; transferring the real-time information or recording from the recording device to a storage for processing by a computing platform, wherein the recording device, the storage and the computing platform may include the same device; identifying the user's facial movements, body movements, or both facial and body movements from the stored recording; determining the user's potential next facial movements, body movements, or both facial and body movements using a state machine; and generating a complete full body animated character that interprets the one or more than one user's facial movement, body movement, or both facial and body movement input in real time or from the recording, wherein the animated character is pre-selected by the user for social media, real time avatar communication and content creation and play back on a player in any medium. There may also be provided instructions for a unique motion algorithm that generates an entirely new body and face performance from recordings of animals as well as humans.

The one or more than one facial and body movements may be input from the user's face, body, voice, heartbeats, brainwaves or any biological or neural link data, or any data that can be analyzed over time. The user movements may also be determined from the input of text or voice. The step of identifying the user's facial movements, body movements, or both facial and body movements may track the user's head position, eye direction, eyebrows and mouth or may user artificial intelligence and/or machine learning to determine the body responses by analyzing previous body responses submitted previously by the user or other users.

A computer-implemented method may be provided for a system to turn ordinary expression input into a complex full body animation in real time or from recordings analyzed over time. The method may include causing one or more than one processor to execute a plurality of instructions for: selecting an animated character a user to using in the animation; recording one or more than one facial movements, body movements, or both facial and body movements from a user on a smart device or a recording device; storing the real-time or recording to a storage for processing in real-time; identifying the user's facial movements, body movements, or both facial and body movements; analyzing the user's potential next facial movements, body movements, or both facial and body movements using a state machine; and generating a complete full body animated character that interprets the one or more than one user's facial movement, body movement, or both facial and body movement input, wherein the animated character is pre-selected by the user. A second user may select the animated character for creating a final full body animation. The method also may include instructions for a driver process for a real time system to turn ordinary expression input into a complex full body animation.

The state machine may include instructions to turn real-time or recorded user expressions into a complex full body animation including a set of states, a set of transitions and a storage variable to remember the current state The state machine may be driven by a user's expression input. A state may occur when the user of a character is engaged in a particular kind of action at any given time. The character may include limited state transitions that integrate restrictions on a next available state that the character can enter from its current state. In other words, the state may be a preprogrammed action based on the type of character, and may include actions including: idling, walking, running, and jumping among other actions. The next state of the character may be pre-animated and then applied to the character in real time using the next available state and the limited state transitions. This transition may be accomplished by analyzing the user's expression input over time. The state machine may determine the next probable character animations. The determination of the next probable state may decreases the amount of computational power required and the time needed to prepare the animation sequence as there are only a limited number of possible next motions for the character and the user.

The state machine may include a library of probable character animations including but not limited to body and facial animation clips covering varying degrees of basic human and animal emotions and actions such as happy, sad, surprise, angry, and neutral, for each unique character. The probable character animations may be discreet actions ranging from a fraction of a second to several minutes, and preferably, less than two (2) seconds in duration.

Each body and facial animation clip may be further subdivided into smaller more specific regions, wherein the specific regions comprise eyes, mouth, upper body, lower body, or hands and comprise their own sub-clip category of body and facial animation clips. Expression input data may be represented as a complex graph or curve, such that the curves may be recognized as patterns or signatures that relate to certain emotions and specific personalities. Additionally, audio waves may be analyzed into graphs of expression input using a live running tally of the last five seconds of expression input to determine more specific emotions to reproduce. The live running tally of the last five seconds of expression input may trigger different body gestures animation clips. The live running tally of the last five seconds of expression input may be combined with the user's speech pattern analysis into a resulting motion signature that may be communicated to a state machine containing pre-animated stylized motions to produce unique and nuanced full body animations based off of the harmonization of the input with the state library.

DETAILED DESCRIPTION OF THE INVENTION

The present claimed system and method may overcome the limitations of the previous systems by providing a system to turn ordinary expression input into a complex full body animation in real time or from recordings analyzed over time. The claimed system and method s may call for taking limited human input from a user's face, body, voice, heartbeats, brainwaves or any biological or neural link data, and producing extremely expressive full body animation for social media, real time avatar communication and content creation in any medium.

Any person from age three to ninety-three may be able to talk into a wireless device (i.e. smartphone, tablet, webcam etc.) or record video and produce original high-quality animation that looks as good as a professionally animated character. The user's face may be all that's needed to create unique motion of an entire body. In some embodiments, text or voice may be all that is needed to create unique motion of an entire body.

From simple webcams to the latest smartphone, tracking the user's head position, eye direction, eyebrows and mouth may be standard features and often used to create entertaining characters on applications such as Snapchat or drive more complex 3D animated characters such as Animoji's created with software such as genies or face rigging. While most facial capture technologies focus on capturing and recreating or re-targeting the user's exact performance, the present system and method may describe applying a unique motion algorithm in executable instructions that may generate an entirely new body and face performance in real time.

Additionally, unlike current technologies, the present system and method may also be capable of rendering full body animations from animals as well as humans which may enable content creators the ability to add lifelike animated animals as characters without spending weeks or months trying to mathematically model an animals motion.

For the sake of this explanation this description may focus on technology commonly used to recognize and track a human or animal face.

All dimensions specified in this disclosure may be by way of example only and are not intended to be limiting. Further, the proportions shown in these Figs. may not be necessarily to scale. As will be understood, the actual dimensions and proportions of any system, any device or part of a system or device disclosed in this disclosure may be determined by its intended use.

Methods and devices that may implement the embodiments of the various features of the invention will now be described with reference to the drawings. The drawings and the associated descriptions may be provided to illustrate embodiments of the invention and not to limit the scope of the invention. Reference in the specification to "one embodiment" or "an embodiment" may be intended to indicate that a particular feature, structure, or characteristic described in connection with the embodiment may be included in at least an embodiment of the invention. The appearances of the phrase "in one embodiment" or "an embodiment" in various places in the specification may not necessarily be referring to the same embodiment.

Throughout the drawings, reference numbers may be re-used to indicate correspondence between referenced elements. In addition, the first digit of each reference number may indicate the Fig. where the element first appears.

As used in this disclosure, except where the context requires otherwise, the term "comprise" and variations of the term, such as "comprising", "comprises" and "comprised" may not be intended to exclude other additives, components, integers or steps.

In the following description, specific details may be given to provide a thorough understanding of the embodiments. However, it may be understood by one of ordinary skill in the art that the embodiments may be practiced without these specific details. Well-known circuits, structures and techniques may not be shown in detail in order not to obscure the embodiments. For example, circuits may be shown in block diagrams in order not to obscure the embodiments in unnecessary detail.

Also, it is noted that the embodiments may be described as a process that is depicted as a flowchart, a flow diagram, a structure diagram, or a block diagram. The flowcharts and block diagrams in the figures may illustrate the architecture, functionality, and operation of possible implementations of systems, methods and computer programs according to various embodiments disclosed. In this regard, each block in the flowchart or block diagrams may represent a module, segment, or portion of code, that may include one or more executable instructions for implementing the specified logical function(s). It should also be noted that, in some alternative implementations, the functions noted in the blocks may occur out of the order noted in the figures.

Although a flowchart may describe the operations as a sequential process, many of the operations may be performed in parallel or concurrently. In addition, the order of the operations may be rearranged. A process may be terminated when its operations are completed. A process may correspond to a method, a function, a procedure, a subroutine, a subprogram, etc. When a process corresponds to a function, its termination may correspond to a return of the function to the calling function or the main function. Additionally, each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

Moreover, a storage may represent one or more devices for storing data, including read-only memory (ROM), random access memory (RAM), magnetic disk storage mediums, optical storage mediums, flash memory devices and/or other non-transitory machine readable mediums for storing information. The term "machine readable medium" may include, but is not limited to portable or fixed storage devices, optical storage devices, wireless channels and various other non-transitory mediums capable of storing, comprising, containing, executing or carrying instruction(s) and/or data.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). One or more than one processor may perform the necessary tasks in series, distributed, concurrently or in parallel. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc. and are also referred to as an interface, where the interface is the point of interaction with software, or computer hardware, or with peripheral devices.

In the following description, certain terminology may be used to describe certain features of one or more embodiments of the invention.

The term "synthesize" may refer to the combination of data to form a system of variables.

The term "hypothesize" may refer to a supposition or proposed explanation made on the basis of limited evidence for starting point for future investigation.

The term "extrapolate" may refer to extend the application of a conclusion based on statistics to an unknown situation by assuming that existing trends will continue.

The term "transpose" may refer to cause two or more pieces of data to change places with each other or transfer to a different context.

The term "harmonize" may refer to producing a pleasing visual combination of color, texture and shape.

The term "interpret" may refer to imitate someone or their actions and/or motions in order to entertain.

The term "recording device" may refer to any device capable of recording or storing a user's voice or face/body motion.

The term "smart device" may refer to any device capable of recording a user's voice or face/body motion, and executing instructions operable on at least one processor and communicatively enabled either wired, wireless or both wired and wireless with other similar devices and/or the Internet.

The term "expression input" may refer to images or data captured by a recording device from a user's face, body, voice, movement, heartbeats, brainwaves or any biological or neural link data or data created by an algorithm to convert text to speech and where the speech is correlated to a user's face, body, voice, movement, heartbeats, brainwaves or any biological or neural link data.

The term "recording" or "recordings" may refer to any real time, pre-recorded, or previously recorded motion pictures that comprise humans or animals that can be analyzed and converted into animated characters.

The term "player" may refer to any device capable of displaying the resulting animation created by the system.

Various embodiments provide a system to convert expression input into a complex full body animation. One embodiment of the present invention provides a system to convert expression input into a complex full body animation. In another embodiment, there is provided a method for using the system. The system and method will now be disclosed in detail.

Referring now to FIG. 1, there is shown a workflow diagram 100 of a system 300 to turn ordinary expression input into a complex full body animation in real time or from recordings analyzed over time, according to one embodiment of the present invention. In some embodiments, the expression input may be a video. In other embodiments, the expression input may be a voice recording. In other embodiments, the expression input may be text input. The voice or text may be interpreted to emotion using software such as applications from nice.com or imotions.com as examples and not limitations. In some embodiments, the text may converted to voice using software such as naturalreaders.com or balabolka.com but other applications are possible and are contemplated.

In some embodiments, text may come from a secondary sources such as from another web site or application such as from Google, Bing, Wikipedia, or from CHAT GPT, for example and not limitation. An API may be used to communicate terms to additional web sites and receiving results back in known formats such that the data may be accurately and efficiently be used by the system and methods.

As can be seen, a user 102 may access facial expressions from a memory. In some embodiments, users may record their facial expressions with a recording device or a smart device 103. In some embodiments, the facial expressions may not be uploaded but may be created by an interpretation system by analyzing the text as the expression input or the verbal input as the expression input to determine an appropriate facial expression. In some embodiments, past verbal inputs or past text inputs and the related facial expressions communicated by the current or other users may be analyzed by an artificial intelligence system in the interpretation system to determine an appropriate facial expression as the recorded information. Sample artificial intelligence systems may include but are not limited to Google Cloud AI Platform or Azure Machine Learning Studio. For example, previous users may make a smiling face when saying "that is great news" and may make a frowning face when saying "that is bad news." The artificial intelligence system in the interpretation system may associate the text or verbal input with determined appropriate facial expression which may include facial movements, body movements, or both facial and body movements including but not limited to the user's head position, eye direction, eyebrows and mouth and may communicate the facial expression as the recorded information.

Figure 2:
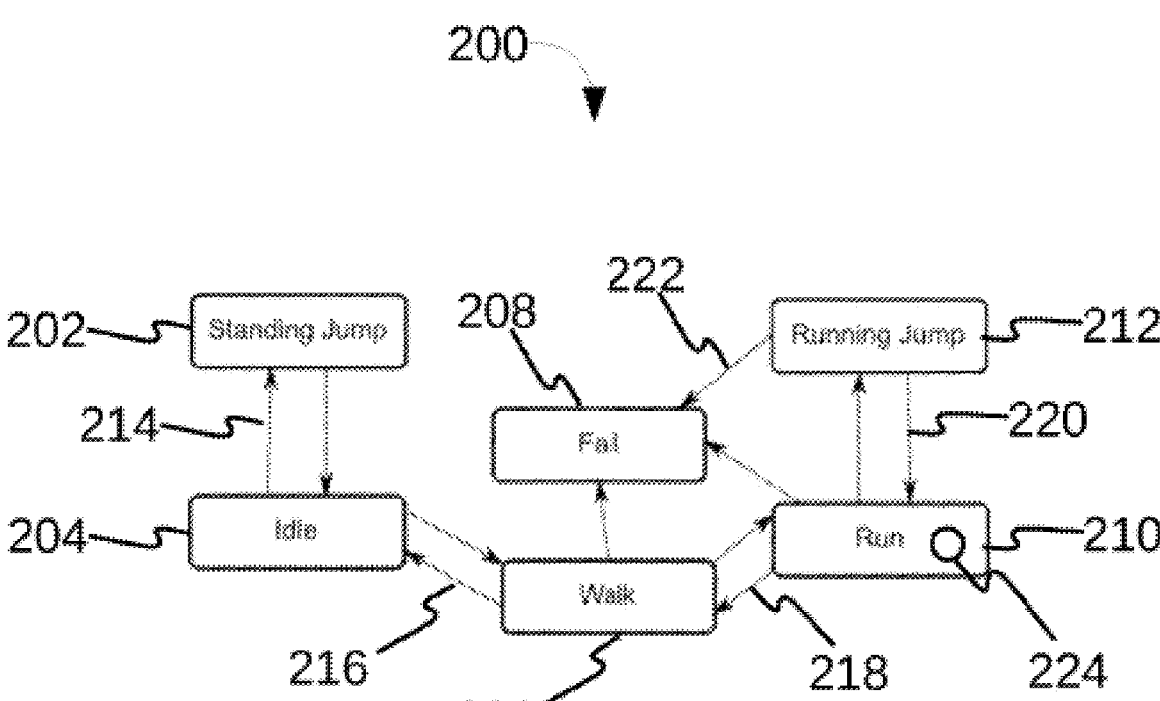
FIG. 2 is a flowchart diagram of state machine character options to turn ordinary expression input into a complex full body animation useful for the system of FIG. 1.

The recording device or the smart device 103 may communicate the recorded information to a computing platform comprising at least one processor, memory, and storage capable of executing instructions operable on the at least one processor to identify 104 the user's 102 facial and/or body movements, analyze 106 the potential next movements using a state machine, and generate 108 a complete full body animated character selected by the user 102 that interprets the user's 102 expression input in real time. The real time animation may be used for uploading to a player 112 through the Internet 110. Additionally, the user's 102 real-time animation may be used to communicate with other users on social media and the like through the Internet 110 or displayed on various players. Optionally, the animated character maybe selected by a second user, such as, for example, a film director, for creating the final full body animation. Referring now to FIG. 2, there is shown a flowchart diagram of state machine 200 character options that may turn ordinary expression input into a complex full body animation. Currently, most video games may use a state machine 200 to animate their game characters. Most state machines 200 may be controlled by joysticks which control the video game character's body motion. Sample state machine are sold by Unity (unity3d.com) and by Unreal (www.unrealengine-.com) but other state engines are possible and are contemplated.

In the present invention, a state machine 200 may be driven by a user's 102 expression input. For example, while the user 102 is smiling, only happy full body and face motions may be allowed in the state machine 200. Or when the state machine 200 recognizes the user's 102 head bobbing back and forth to a rhythm, the state machine 200 may only allow dance motions to be played on the full body animation.

State Machine Basics

A state 202, 204, 206, 208, 210 and 212 may occur when a character is engaged in a particular kind of action at any given time. The actions available depend on the type of character, but typical actions include idling 201, walking 206, running 210, jumping 212, falling 208, etc. These actions may be referred to as states 202-212, in the sense that the character is in a "state" where the character is walking 206, idling 204, etc. Generally, the character may have restrictions on the next state 202-212 the character may go to rather than being able to switch immediately from any state to 202-212 any other. For example, a running jump 212 may only be taken when the character is already running 210 and not when it is at a standstill or idle 204, so the character could never switch straight from the idle 204 state to the running jump 212 state. The options for the next state 202-214 that a character may enter from its current state 202-212 are referred to as state transitions 214, 216, 218, 220, and 222. Taken together, the set of states 202-212, the set of transitions 214-222 and a storage variable or marker to remember the current state 224 may form a state machine 200.

The states 202-212 and transitions 214-222 of a state machine 200 may be represented using a graph diagram, where the nodes represent the states 202-212 and the arcs, arrows between nodes, represent the transitions 214-222.

The current state 224 may be a marker or highlight that is placed on one of the nodes and can then only move to another node 206, 208, or 212 along one of the transition arrows 214-222.

As can be seen, the states 202-212 that the character may be in at any given point in time are idle 204, walk 206, run 210, standing jump 202, fall 208 and running jump 212. The character may transition 214-222 between idle 204 and standing jump 202; idle 204 and walk 206; walk 206 and fall 208; walk 206 and run 210; run 210 and fall 208; run 210 and running jump 212; running jump 212 and fall 208. Using the known states 202-212 and the limited transitions 214-222, the next state 202-212 of this character may be pre-animated and then applied to the character in real time. So when the user's 102 expression input may be analyzed, the state machine 200 may have already provided the next probable animations of the character to the system 300. This anticipation of next states may decrease the amount of computational power required and the time needed to prepare the animation sequence as there are only a limited number of possible next motions or states 202-212 for the character and user 102.

Figure 3:
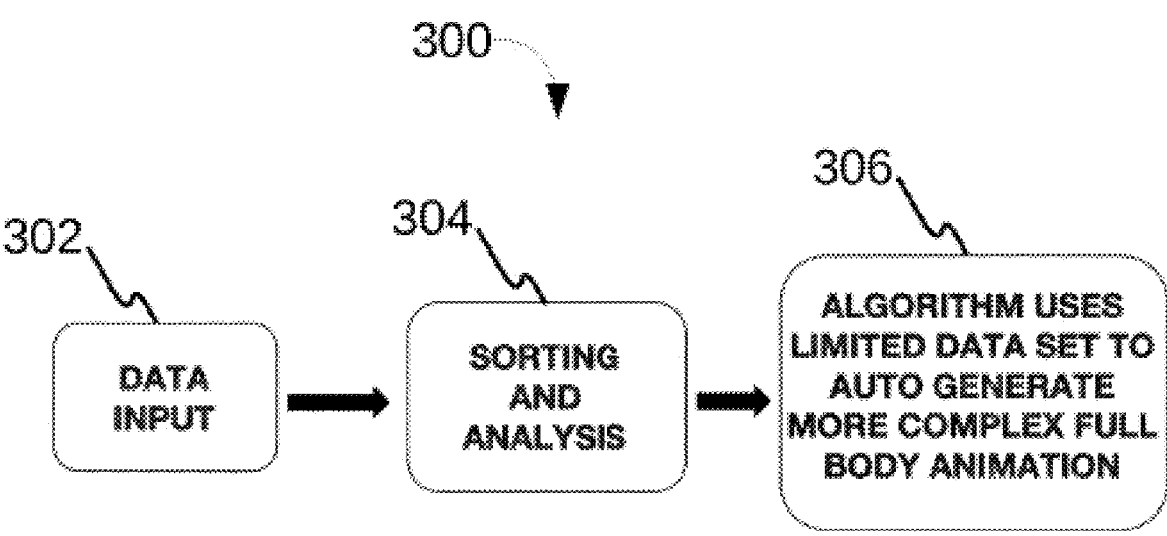
FIG. 3 is a flowchart diagram of a real time system to turn ordinary expression input into a complex full body animation of FIG. 1.

Referring now to FIG. 3, there may be shown a flowchart diagram of a real time system 300 to turn ordinary expression input into a complex full body animation. Computer generated characters for video games, episodic shows and feature films may usually be comprised of a 3D polygonal model and an underlying skeletal control system called a rig. The rig may be animated by setting key poses at certain moments in time, or using more advanced characters techniques such as motion capture where a human performer's body movement controls the rig. In either case, the animation may be saved as discreet actions ranging from a fraction of a second to several minutes. Most actions created for video games may be roughly 1-2 seconds in duration. The present invention utilizes the capabilities of a game engine that may include a library of animation that may contain body and facial animation clips covering the basic human emotions such as happy, sad, surprise, angry, neutral, etc. for each unique character. Each emotion or state 202-212 may include several clips ranging from subtle expression to extreme. Within a happy emotional state, the character's face and body may range from a subtle smile to laughing to jumping for joy.

In some embodiments, the animation may be an animated character that was created in advance and does not reflect the person using the system. The person using the system may be able to select the animated character or the system may select the character. The character selected by the system may be based on the input or the action inputted to the system. In other embodiments, the animation may be a simulation of the person using the system which may be created from an image processed by the system such as by MetaHuman option available at unrealengine.com. The animation may be in two dimensions or in three dimensions and may be appropriate to be viewed in a virtual reality headset or display device.

Blending in real time between animation clips may be standard for most video games where characters can run, jump, walk, turn, stop, shoot a weapon, etc. The present invention uses the same principles to blend emotion action. The motions or states 202-212 in most video games may be controlled by a joystick or keyboard. The motions or states 202-212 for the present invention may be determined by the user's 102 expression data input 302 that may be captured by the recording device or the smart device 103 running the system's 300 game engine's live link face application. While facial capture systems have been used to control applications, such as moving a cursor on the screen, or driving an Apple Animogi character, the present system and method may be unique in that it analyzes 304 the expression input and motion over time to trigger pre-animated clips 306.

If the user 102 is smiling for more than a half second, the system 300 may trigger a happy emotional state in the game engine and may only blend between happy animation clips. If the user's eyebrows move down for more than half a second, the software may trigger an angry emotional state and only may play clips from the angry library of clips. Combined with other factors such as rapid eye darts, head motion and jaw movement, the system 300 may recognize 304 a unique complex signature movement which may trigger a unique blend of body and facial movement which ranges from a mild to extreme emotional states.

Each animation clip, whether for body or face, may be further subdivided into smaller more specific regions. For example the eyes, mouth, upper body, lower body, or hands may contain their own sub clip category of motion animations.

The greater the library of clips the more unique the animation may be. The user 102 may dial up or down the level of exaggeration in their performance. In most cases the final performance may be some blend between the user's 102 live unfiltered motion blended with the animated performance.

Figure 4:
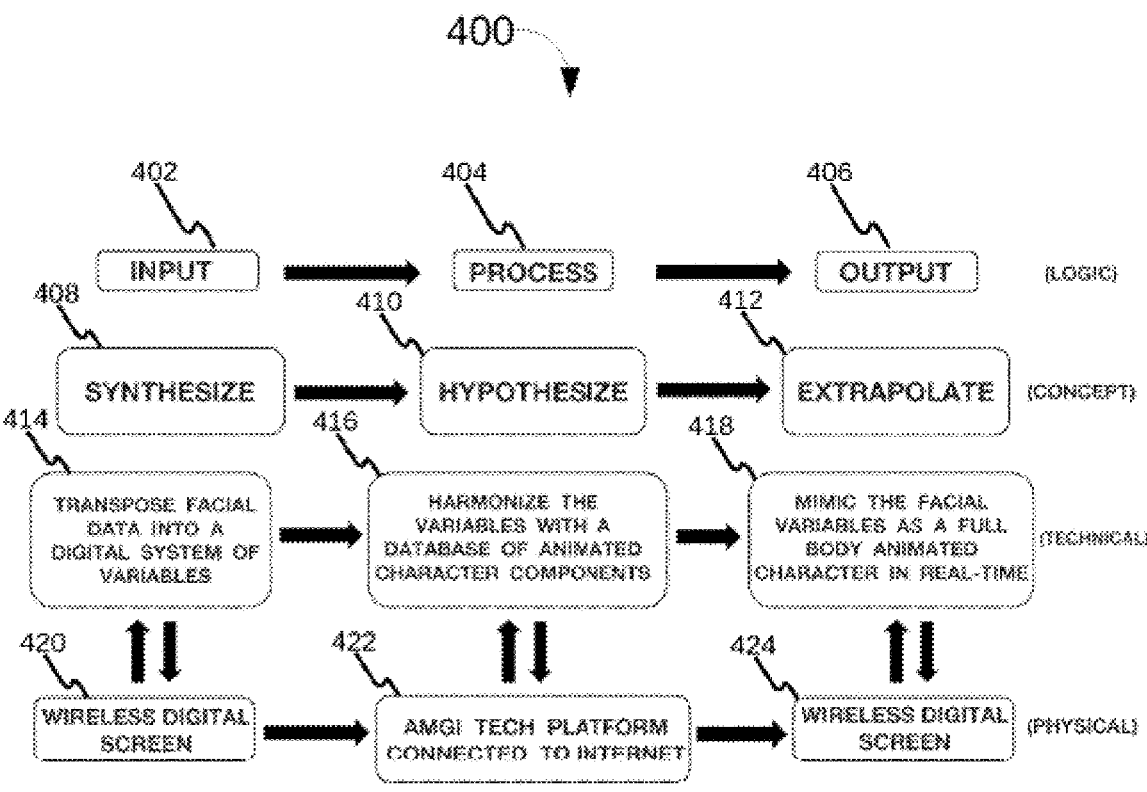
FIG. 4 is a driver process for a flowchart diagram of a real time system to turn ordinary expression input into a complex full body animation of FIG. 1.

Referring now to FIG. 4, there may be shown a flowchart diagram of a driver process 400 for a real time system 300 to turn ordinary expression input into a complex full body animation. Expression input 402 may also be analyzed 404 over time. All expression input 402 data may be represented as a complex graph or curve. Such curves may be recognized as patterns or signatures that relate to certain emotions and even specific personalities. Using similar techniques to audio wave analysis such as Fast Fourier transform or audio spectrogram, the present invention may apply these techniques to graphs of expression input 402. In practice, a running live tally of the last five (5) seconds of expression input 402, such as, for example, facial movement may determine more specific emotions to reproduce. For example, a high frequency of blinking, rapid eye darts, or even a slow blink may be used to trigger a different body gestures. Combined with the user's 102 speech pattern analysis, the motion signatures may be communicated to a state machine 200 containing pre-animated stylized motions to produce unique and nuanced full body animated results.

In most typical facial recognition systems, such as, for example, Apple's(r) face recognition technology, the system may read fifty-one unique facial shapes in real time and then apply a filter, in real time, over the recognized facial shape. The present system 300 may sample facial data over time and then may then transpose 414 that facial data into variables that may identify the user's 102 expression which cannot be done with instantaneous systems.

For example, rapid blinking at a higher rate may show signs of nervousness. Then, the variables may be harmonized 416 with the animated character so that multiple facial data points, eyes, eyebrows, lips, mouth, may be analyzed and then applied to the animated character. The same analysis may apply to the user's 102 body movement.

Finally, the time based data analysis may be used to produce a full body character animation. The data analysis may continue as a running tally over time. As will be understood by those with skill in the art with reference to this disclosure, any time period may be used for analysis. Each animated character may have their own individual motions and limitations on those motions that are signatures to the characters themselves. When a user 102 data is input 302 into the system 300, the system 300 may harmonize the user's 102 movement with the library clips of the motion of the animated character and the animated character's limitations. For example, even though a user 102 raises their hands above their head, if the animated character is motion limited to raising their hands only to their shoulders, then the data may be harmonized 416, so that the final output does not break the character's limitations.

Even the user's 102 background may be used as data input and harmonized. For example, if a projection of a volcano is shown behind the user (or if the user 102 is at a volcano), the heat from the volcano may be used to make the animated character sweat.

Machine learning or artificial intelligence may also be used, with sufficient data points to harmonize 416 with the final output of the system 300. For example, the system 300 may be used with a library of video clips to bring people back to "life" by taking the clips library and applying the person's personal characteristics to the data stream performed by another actor. For example, Humphrey Bogart's many films may be used to make an animated video of him for a new purpose. Additionally, voice analysis may also be part of these systems for analysis and machine learning. Particularly, the system 300 may analyze data points over time to make full body animations.

The transposed 414 variables may be shown or displayed on any wireless device, over the Internet 422 and the final output may be shown on the same wired, wireless screen 242 displays. What has been described is a new and improved real time system to turn ordinary expression input into a complex full body animation, overcoming the limitations and disadvantages inherent in the related art. As a result, the technical problem of converting text or voice or actions into logical animated representation in a predictable and efficient manner for a period of time is addressed.

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive.

Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. § 112.

What is claimed is:

1. A computer-implemented method for a system to turn ordinary expression input into a complex full body animation in real time or from recordings analyzed over time:

executing, by one or more than one processor, the following steps:

a. selecting an animated character a user to using in the animation;

b. accessing one or more than one facial movements, body movements, or both facial and body movements from a user on a smart device or a recording device;

c. storing the real-time or recording to a storage for processing in real-time;

d. identifying the user's facial movements, body movements, or both facial and body movements;

e. analyzing the user's potential next facial movements, body movements, or both facial and body movements using a state machine wherein the state machine is driven by a user's expression input, wherein a state occurs when a character is engaged in a particular kind of action at any given time; and f. generating a complete full body animated character that interprets the one or more than one user's facial movement, body movement, or both facial and body movement input, wherein the animated character is preselected by the user and wherein the character comprises limited state transitions that integrate restrictions on a next available state that the character can enter from its current state and wherein the next state of the character is pre-animated and then applied to the character in real time using the next available state and the limited state transitions, by analyzing the user's expression input over time, the state machine determines the next probable character animations, thereby decreasing the amount of computational power required and the time needed to prepare the animation sequence since there are only a limited number of possible next motions for the character and the user.

2. The method of claim 1, wherein the state machine comprises instructions to turn real-time or recorded user expressions into a complex full body animation comprising a set of states, a set of transitions and a storage variable to remember the current state.

3. The method of claim 1, wherein the state is a preprogrammed action based on the type of character, and comprise actions including: idling, walking, running, and jumping.

4. The method of claim 1, wherein the state machine comprises a library of probable character animations comprising body and facial animation clips covering varying degrees of basic human and animal emotions and actions such as happy, sad, surprise, angry, and neutral, for each unique character.

5. The method of claim 4, wherein each body and facial animation clip is further subdivided into smaller more specific regions, wherein the specific regions comprise eyes, mouth, upper body, lower body, or hands and comprise their own sub-clip category of body and facial animation clips.

6. The method of claim 1, further comprising:

executing by one or more than one processor, a driver process for a real time system to turn ordinary expression input into a complex full body animation.

7. The method of claim 6, wherein all expression input data can be represented as a complex graph or curve, such that the curves can be recognized as patterns or signatures that relate to certain emotions and specific personalities.

8. The method of claim 7, further comprising:

executing by one or more than one processor, the step of using audio wave analysis to graphs of expression input using a live running tally of the last five seconds of expression input to determine more specific emotions to reproduce.

9. The method of claim 7, further comprising:

executing by one or more than one processor, the step of combining the live running tally of the last five seconds of expression input are combined with the user's speech pattern analysis into a resulting motion signature that is sent to a state machine containing pre-animated stylized motions to produce unique and nuanced full body animations based off of the harmonization of the input with the state library.

10. The method of claim 1, wherein the accessed movements are recorded by a user.

11. The method of claim 1, wherein the accessed movements are determined by an algorithm that matches inputted words or phrases with accessed movements.

12. A computer-implemented method for a system to turn ordinary expression input into a complex full body animation in real time or from recordings analyzed over time, the method comprising:

executing, by one or more than one processor, the following steps:

a. selecting an animated character a user to using in the animation;

b. accessing one or more than one facial movements, body movements, or both facial and body movements from a user on a smart device or a recording device;

c. storing the real-time or recording to a storage for processing in real-time;

d. identifying the user's facial movements, body movements, or both facial and body movements wherein all expression input data can be represented as a complex graph or curve, such that the curves can be recognized as patterns or signatures that relate to certain emotions and specific personalities;

e. analyzing the user's potential next facial movements, body movements, or both facial and body movements using a state machine;

f. a driver process for a real time system to turn ordinary expression input into a complex full body animation and g. generating a complete full body animated character that interprets the one or more than one user's facial movement, body movement, or both facial and body movement input, wherein the animated character is preselected by the user.

13. The method of claim 12, further comprising:

executing by one or more than one processor, the step of using audio wave analysis to graphs of expression input using a live running tally of the last five seconds of expression input to determine more specific emotions to reproduce.

14. The method of claim 12, further comprising:

executing by one or more than one processor, the step of combining the live running tally of the last five seconds of expression input are combined with the user's speech pattern analysis into a resulting motion signature that is sent to a state machine containing pre-animated stylized motions to produce unique and nuanced full body animations based off of the harmonization of the input with the state library.

* * * * *